Patented Jan. 29, 1935

1,989,359

UNITED STATES PATENT OFFICE 1,989,359

CLEAR LIQUID EGG

Herman Heuser, Evanston, Ill.

No Drawing. Application January 23, 1933,
Serial No. 653,195

20 Claims. (Cl. 99—11)

This invention relates to the production of clear liquid egg products, and particularly to preserved egg products and a process of making the same.

This application is a continuation in part of my application Serial No. 422,949, filed January 23, 1930. Egg (by which, of course, is meant egg from which the shell has been removed) may be preserved by sugar, for example, as described in my copending application Serial No. 350,442. Such an egg product when made from whole egg is a densely opaque yellow colored lemon liquid. When prepared from egg yolk, it has the appearance of a lemon or orange colored cream. If such preserved egg is likewise sterilized, it becomes densely opaque and of a greyish-yellow or greyish-red muddy color, due to the coagulation of egg albumen. Egg products of the types described are distinctly unattractive in appearance and are objectionable to the consumer.

By means of the present invention, a clear egg product may be prepared, and this egg product may be completely protected against bacterial decomposition and mold. The product likewise permits sterilization at higher temperatures than normal without precipitation of the albumen. In accordance with this invention, the shells of the eggs are removed and the egg is suitably stirred to produce a uniform homogeneous liquid which resembles common cream in appearance. To this liquid a suitable sugar either in solid or syrup form, such for example as granulated sucrose, is added to egg while the latter is being stirred.

In addition to the sugar a suitable amount of a non-toxic albumen-dissolving salt is added. The addition of such salt results in a change of structure in the egg-sugar mixture, such that upon removal of the emulsified air, a clear liquid is produced. By clear it is meant that no particles are visible to the eye, nor is there any perceptible cloudiness in the egg product. For example, when contained in a glass jar two inches in diameter, ordinary typewriting held on the far side of the jar may be clearly read through the liquid. The change in structure may be due to the solution of the albumens which are believed to be the normally opaque or cloudy portions of the egg, by the sugar and albumen-dissolving salt. The exact nature of the physical or chemical change is not understood and the apparent solution may, of course, be a colloidal solution. It may be that the salt shrinks the egg albumen to a point where it disappears from sight and becomes either dissolved or suspended as a colloid.

The apparent dissolving effect of the albumen-dissolving salt increases with an increase in the amount of sugar present. An increase in the sugar content decreases the heat penetrability of the liquid egg, but this decrease is offset by the albumen-dissolving salts, which increase it. It is preferred to add an amount of sugar sufficient to constitute at least 50 per cent. by weight of the egg-sugar mixture.

Any suitable albumen-dissolving salt as distinguished from albumen-precipitating salts (the latter class including the salts of the heavy metals) may be employed. Salts that are reducing agents, such for example as the phosphites, hypophosphites and pyrophosphites are particularly suitable from among the mineral salts. The lactates, formates and acetates, and the salts of the various fruit acids, such as the citrates and tartrates, are some of the best adaptable among the organic salts.

The albumen-dissolving salt may be added to the egg liquid at any suitable stage of the process, and preferably in a quantity from 2 to 4 per cent. of the combined weight of the egg and sugar. It is preferred to employ about 3.0 per cent. of sodium hypophosphite.

After the sugar and albumen-dissolving salt have been thoroughly incorporated in the egg, the absorbed, i. e., the emulsified air is removed by suitable means, but preferably by subjecting the mixture to a high centrifugal force (as more fully described in my aforesaid co-pending application) or to a high vacuum, by which such emulsified air may be thoroughly and quickly removed. Where a vacuum is employed, it is preferred to apply it in impulses by alternately raising and lowering the degree of vacuum. Centrifuging preferably is carried out continuously, the liquid egg being supplied in a continuous stream to a suitable centrifuge and discharged therefrom in a continuous stream. Centrifuging has the advantage that it not only removes the air, but also removes any solid particles, such as egg shell and membrane which may be present in the liquid egg.

The egg product thus produced is a clear transparent liquid having an attractive reddish amber color, and the approximate appearance of a deep colored honey.

The liquid egg product now is filled into any suitable trade packages to substantially the full capacity of the packages, and the latter are then hermetically sealed. The egg product so produced is durable, and the pleasing appearance thereof permits the use of glass containers or bottles. Where the albumen-dissolving salt is also a reducing agent, as in the case of sodium hypophosphite, durability is increased by reason of the fact that any oxygen which may reach the egg will be neutralized. The reducing agent likewise tends to eliminate any burnt or cooked taste to a sterilizing operation.

Where clear sterilized liquid egg is desired, the trade packages are preferably small in size, and are but partially filled in order to leave a sufficient space for expansion and agitation of the egg product during the sterilizing operation, to which it is preferred to submit the product.

In carrying out sterilization, the sealed packages are introduced into a suitable sterilizing apparatus which will heat them to a sterilizing temperature of approximately 70° C. within twenty minutes. The packages are then maintained at that temperature for about thirty to fifty minutes, the exact length of time depending upon the age of the eggs involved, and they are thereafter cooled to room temperature within twenty minutes. The packages preferably are turned around during the entire sterilizing operation in order to produce adequate agitation. Hot and cold water may be used if desired as the heating and cooling media.

The sterilization may be carried out at a temperature slightly below 70° C., and on the other hand, due to the fact that the presence of the albumen-dissolving salt tends to prevent coagulation of the albumen, the operation may be carried out at a temperature as high as 90° C. The sterilizing period is shortened or prolonged, depending upon whether the temperature is higher or lower. It is preferred to limit the maximum temperature to about 82° C.

As already pointed out, if the albumen-dissolving salt is a reducing agent, it eliminates the burnt or cooked taste due to the sterilizing operation, and also removes oxygen which may become dissolved or occluded in the egg product. Not all suitable albumen-dissolving salts are reducing agents. Where such a non-reducing albumen-dissolving salt is employed, such as an alkali-lactate or acetate, or any alkali citrate or tartrate, removal of occluded oxygen in the egg is effected by the addition of a non-toxic reducing agent, for example, an alkali phosphite compound or alkali formate. For this purpose, sodium hypophosphite is preferably employed in a quantity of from 0.1 to 0.25 per cent. In this percentage, it is too small to act as an albumen solvent.

The foregoing detailed description has been given for clearness of understanding only, and no unnecessary limitations should be understood therefrom, but the appended claims should be construed as broadly as permissible, in view of the prior art.

Egg as used herein means the whole egg, or the egg yolk.

What I claim as new, and desire to secure by Letters Patent is:

1. Preserved clear de-emulsified egg comprising a preserving quantity of sugar and an albumen-dissolving salt in an amount sufficient to render the egg-sugar mixture clear.

2. Preserved clear egg which contains at least 50 per cent. of sugar by weight, a non-toxic albumen-dissolving salt, and a non-toxic reducing agent.

3. Preserved clear egg which contains a preserving quantity of sugar and from 2 to 4 per cent. of an albumen-dissolving salt, and which has been sterilized by heat.

4. Preserved egg which contains at least 50 per cent. of sugar by weight, and from 2 to 4 per cent. by weight of sodium hypophosphite based on the egg-sugar mixture.

5. Preserved raw de-emulsified clear egg containing at least 50 per cent. of sugar by weight and from 2 to 4 per cent. by weight of sodium hypophosphite based on the egg-sugar mixture.

6. The process of preserving egg which consists in disintegrating the egg, gradually incorporating a preserving quantity of sugar into the egg while stirring the latter, incorporating a non-toxic albumen-dissolving agent into the egg in an amount sufficient to render the finished product clear, incorporating a non-toxic reducing agent into the egg, physically removing emulsified air from the mixture to reduce the emulsion to a liquid and sealing the mixture in a closed container.

7. The process of preserving egg which consists in incorporating a preserving quantity of sugar into the egg while stirring the latter, incorporating a non-toxic albumen-dissolving agent into the egg in an amount sufficient to render the finished product clear, incorporating a non-toxic reducing agent into the egg, physically removing emulsified air from the mixture to reduce the emulsion to a liquid and sealing the mixture in a closed container.

8. The process of preserving egg which consists in incorporating a preserving quantity of sugar into the egg, incorporating a non-toxic albumen-dissolving agent into the egg in an amount sufficient to render the finished product clear, physically removing emulsified air from the mixture to reduce the emulsion to a liquid, sealing the mixture in a closed container, and sterilizing the sealed mixture with heat.

9. The process of preserving egg which consists in disintegrating the egg, incorporating a preserving quantity of sugar into the egg while stirring the latter, incorporating a non-toxic albumen-dissolving salt into the egg in an amount from 2 to 4 per cent. by weight of the egg-sugar mixture, subjecting the mixture to centrifugal action to remove emulsified air, sealing the mixture in a closed container, and heating the sealed mixture to a temperature of from 70° C. to 82° C.

10. The process of preserving egg which consists in incorporating a preserving quantity of sugar into the egg, incorporating a non-toxic albumen-dissolving salt into the egg in an amount sufficient to render the finished product clear, removing emulsified air from the mixture to de-emulsify the egg, and sterilizing the mixture with heat.

11. The process of preserving egg which consists in incorporating a preserving quantity of sugar into the egg, incorporating sodium hypophosphite into the egg in an amount sufficient to render the finished product clear, removing emulsified air from the mixture in an amount sufficient to render the finished product clear, and heating the mixture to a sterilizing temperature for a period of time sufficient to sterilize the mixture.

12. The process of preserving egg which consists in disintegrating the egg, incorporating sugar into the egg in an amount to constitute at least 50 per cent. by weight of the mixture, incorporating a non-toxic albumen-dissolving salt having reducing properties into the egg in an amount to constitute approximately 3.0 per cent. by weight of the egg-sugar mixture, subjecting the mixture to the action of centrifugal force to remove emulsified air, and heat-sterilizing the centrifuged liquid.

13. The process of preserving egg which consists in disintegrating the egg, incorporating a preserving quantity of sugar into the egg, incorporating a non-toxic albumen-dissolving salt having reducing properties into the egg in an amount to constitute from 2 to 4 per cent. by weight of the egg-sugar mixture, subjecting the mixture to successive vacuum impulses to remove emulsified air, and heat sterilizing the resulting clear liquid.

14. The process of preserving egg which consists in incorporating a preserving quantity of sugar into the egg, incorporating a non-toxic albumen-dissolving salt into the egg in an amount to constitute from 2 to 4 per cent. by weight of the egg-sugar mixture, and effecting a removal of emulsified air to reduce the emulsion to a liquid.

15. The process of preserving egg which consists in incorporating a preserving quantity of sugar into the egg, incorporating a non-toxic albumen-dissolving salt into the egg in an amount sufficient to render the finished product clear, and effecting a removal of emulsified air to reduce the emulsion to a liquid.

16. The process of preserving egg which consists in incorporating a preserving quantity of sugar into the egg, incorporating a non-toxic albumen-dissolving salt having reducing properties into the egg in an amount sufficient to render the finished product clear, and centrifuging the mixture to remove the air therein, and thereby to reduce the mixture to an unemulsified liquid.

17. The process of preserving egg which consists in incorporating a preserving quantity of sugar into the egg, incorporating sodium hypophosphite into the egg in an amount sufficient to render the finished product clear, and effecting a removal of air from the mixture to deemulsify the egg.

18. The process of preserving egg which consists in incorporating a preserving quantity of sugar into the egg, incorporating an albumen-dissolving salt of non-reducing properties into the egg-sugar mixture, in an amount sufficient to render the finished product clear, and incorporating a reducing agent into the mixture.

19. In the process of preserving egg, the steps which consist in incorporating a preserving amount of sugar into the egg, and incorporating a non-toxic albumen-dissolving salt having reducing properties into the egg in an amount constituting from 2 to 4 per cent. of the egg sugar mixture.

20. As a new article of commerce, clear liquid whole egg, in which the normally opaque portions are dissolved in a clear solvent including sugar and an albumen solvent.

HERMAN HEUSER.